United States Patent [19]

Williams et al.

[11] Patent Number: 5,084,841
[45] Date of Patent: Jan. 28, 1992

[54] PROGRAMMABLE STATUS FLAG GENERATOR FIFO USING GRAY CODE

[75] Inventors: Kenneth L. Williams, Richardson; Morris D. Ward, Garland, both of Tex.

[73] Assignee: Texas Instruments Incorporated, Dallas, Tex.

[21] Appl. No.: 393,440

[22] Filed: Aug. 14, 1989

[51] Int. Cl.⁵ .................. G11C 7/00; H03K 13/02
[52] U.S. Cl. .................. 365/189.07; 365/221; 377/34; 341/98
[58] Field of Search .......... 365/78, 221, 189.07, 365/219; 341/96, 97, 98; 377/34, 39

[56] References Cited

U.S. PATENT DOCUMENTS 3,588,461  6/1971  Halsall ..................... 341/97
4,780,894 10/1988  Watkins et al. ............. 377/34
4,873,666 10/1989  Lefebvre et al. ........... 365/221

FOREIGN PATENT DOCUMENTS

1523123  8/1978  United Kingdom ........... 341/98

Primary Examiner—Joseph A. Popek
Attorney, Agent, or Firm—B. Peter Barndt; Richard L. Donaldson

[57] ABSTRACT

A FIFO 12 has a status flag generator 14. The status flag generator 14 includes a register programmable to "N". It also includes two sets of gray-code counters and a register (22,23,21;26,25,24) that are driven by separate READ and WRITE CLKS. The registers and counters are connected to comparators (31-36) for generating a plurality of signals that are input to output latches (41-43). The status flag generator is capable of generating status signals of FULL, HALF-FULL, EMPTY, FULL-N and EMPTY+N. N is a user-defined number that is programmed into a register 20 that is selectively connected to one or more of the programmable gray-code counters (23,24).

26 Claims, 6 Drawing Sheets

| SIGNAL | WA - RA |
|---|---|
| WA+512=RA | 512 |
| WA+512=RA-1 | 511 |
| WA=RA | 0 OR 1024 |
| WA+N=RA | 1024-N |
| WA+N=RA-1 | 1023-N |
| WA-1=RA+N | N+1 |
| WA=RA+N | N |

PROGRAMMABLE STATUS FLAG GENERATOR FIFO USING GRAY CODE

TECHNICAL FIELD OF THE INVENTION

The invention relates in general to the asynchronous transmission of digital signals, and more particularly relates to a memory buffer in which the asynchronous reading and writing of digital information is carefully controlled and monitored through the generation of FULL, HALF-FULL, EMPTY, and other programmable status signals.

BACKGROUND OF THE INVENTION

The wide acceptance and current popularity of data transmission is evidenced by the proliferation of digital peripheral equipment which is connectable to computer processors or the like. In transmitting data from one piece of equipment to another, such transmission often requires communication between extremely fast operating equipment such as processors, and other slower operating peripheral equipment such as disk storage systems and printers.

The most efficient use of such a system is realized when the various interconnected components of the system can communicate asynchronously, so that the fast operating equipment need not be delayed in order to communicate with slow peripheral equipment, such as a printer.

It is a well-known practice to employ memories as intermediate buffers between the components of the system for storing data written therein by the transmitting equipment at one speed and read therefrom by destination equipment at another speed. With this arrangement it is imperative that memory storage space is available when the transmitting equipment transmits data. Moreover when the memory storage space is full, it is necessary that the transmitting equipment be signaled so that further transmission cannot be accomplished. It is equally important that the destination equipment be signaled by the intermediate buffer when the memory storage is empty so that further reading thereof cannot be accomplished until additional data has been written therein by the transmitting equipment.

In the past, such requirements have been met by shift registers that serially write digital words therein at a desired speed and read serially therefrom at a different speed. Such devices are of limited storage and have unacceptable delay times. More recently, random access memories have been developed which have a First In First Out (FIFO) characteristic. These memories can be quickly accessed to read out the oldest data stored in the memory. The movement of data within such a memory is managed by a control section which maintains an account of which storage cells hold effective data. See, for example, U.S. Pat. Nos. 4,151,068 and 4,459,681.

Such asynchronous FIFO memories are normally equipped with status flag circuitry to detect various degrees of fullness of the memory array including EMPTY, FULL, HALF-FULL and various other fractions of the total memory capacity. However, there is often a need for a status flag to detect degrees of fullness other than these fixed fractions. As such, the users frequently desire the status flags that can be programmed and reprogrammed into the FIFO.

However, the status flags of such FIFOs and status flag circuitry have encountered problems. One type of circuitry uses binary counters connected to read and write clocks (READ CLK; WRITE CLK) and also connected to binary adders and subtractors. The binary adders or subtractors detect differences between read and write addresses as such READ and WRITE CLK pulses are counted. These adders and subtractors are relatively large circuits and usually are slow to generate status signals. As such, the entire system has to be slowed down to account for the speed of the component adders and subtractors. Also, when multiple outputs switch on binary counters, particularly in opposite directions, momentary false output results appear thus requiring even more time for the system to wait for the output results to stabilize. A further problem with such prior art devices is that they require additional circuitry to generate status flags and such additional circuitry often requires counter outputs, control signals, etc. to arrive at precisely controlled times in relation to each other. In an integrated circuit environment, such coordination of timing and control signals is quite difficult to achieve due to the wide range of operating conditions and processing variations.

As such, there has arisen a need for a FIFO that has programmable status flags and who's operation is immune from different operating conditions and process variations.

SUMMARY OF THE INVENTION

The invention addresses the needs of the prior art by providing a FIFO, and particularly a FIFO with high speed status flag generating circuitry that is programmable and immune to operating conditions and process variations. These results are achieved by providing gray-code counters and storage registers to monitor the reading and writing operations. A register is provided with a default number or a user-defined (programmable) number, N. The number N is used to preset two of the gray-code counters. The outputs of the read register and gray-code counters and the write register and gray-code counters are combined in one or more comparators to generate one or more status signals. Status signals are derived from output latches and logic circuitry that receive the output signals from the comparators.

As such, the invention provides for a method as well as an apparatus to convert the binary clock signals to gray-code signals. Thereafter, the gray-code signals are compared to each other in order to ultimately generate flag signals indicating the status of the FIFO, i.e. Full, Empty, Half-Full or Full −N or Empty +N.

In the preferred embodiment, a memory array is provided into which data may be written and from which data may be read in response to respective READ CLK and WRITE CLK pulses. Gray-code counters receive serial read and write pulses and count the pulses in gray-code. Gray-code refers to a system of binary numbers in which only one of the bits is different between any two consecutive numbers. So, in a gray-code counter, only one output changes state due to any given active transition of the clock input. Such a feature eliminates any decoding glitches which normally occur when multiple outputs switch at the same time. Thus, a gray-code counter eliminates the need for any timing delays necessary to filter out such glitches.

In the preferred embodiment, the write and read clock signals are input to 10 bit gray-code counters. Each counter is preset to zero. The output of each counter drives a respective 10 bit register that is preset to one less than the full amount of the FIFO, in this case, 1023. A separate 9 bit register receives a default or a programmable number, N, that is converted from binary to gray-code. The write and read clock signals are also input to other gray-code counters which are preset to the gray-code value of N. The outputs of the registers and counters are fed into six comparators for generating a number of secondary signals. These secondary signals are further combined by output logic circuitry to generate Full, Half-Full, Empty, Full −N and Empty +N status flags, where N is the number selected by the user and may assume any value between zero and 511.

DETAILED DESCRIPTION

Figure 1A:
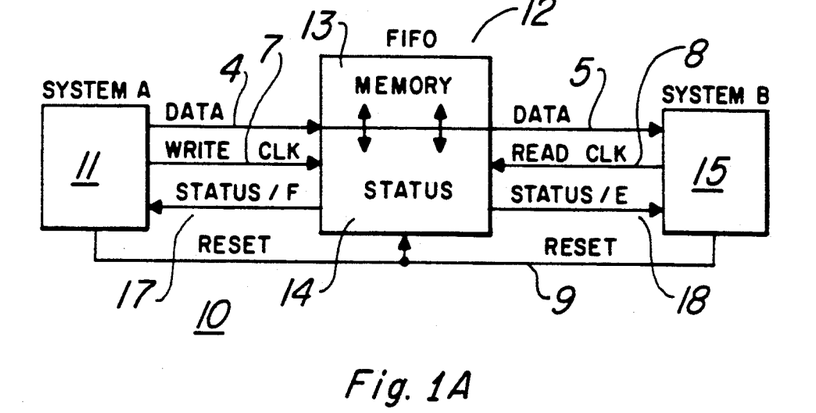
FIG. 1A is a schematic view of the network including the FIFO and two systems.

While the present invention may find a wide variety of applications in digital communications, FIG. 1A is an example of an environment in which the invention may be advantageously practiced. The FIFO memory buffer 12 includes a RAM based FIFO memory 13 with status generating circuitry 14. As shown, the FIFO 12 is situated between one system A, 11, which may be a high speed data processor that is in communication through FIFO 12 to another system B, such as a low speed cathode ray tube (CRT) terminal 15. The data communication is in the direction from the data processor 11 to the CRT terminal 15. In the example, the data processor 11 is capable of writing data into the FIFO memory 13 at a rate much higher than can be read by the CRT terminal 15. Data processors are capable of transmission rates in the neighborhood of 9600 bits per second, while typical peripheral components, such as the CRT terminal 15, may be capable of transmission rates of only 1200 bits per second.

The FIFO memory buffer 12, therefore, provides an intermediate data storage means wherein data may be written at a first rate, and read therefrom at a different rate. It should be understood, however, that the FIFO memory buffer 12 of the present invention may be utilized with equal effectiveness when the data write speed is slower than the data read speed. In those cases where data transmissions into the FIFO memory buffer 12, i.e., data write operations, are at rates higher than the data read operations, the primary concern is with the detection of a completely filled memory and the alerting of the data processor 11 of the same such that the data transmissions can be interrupted. On the other hand, when the rate of data read operations exceeds that of the write operations the concern is with the detection of an empty FIFO memory buffer 12. In this event the CRT terminal 15 must be alerted of such status in sufficient time such that a further read command by the CRT terminal 15 does not cause the meaningless read operation of an empty FIFO memory buffer 12.

In practical digital data transmissions, both empty and full memory buffer situations may occur as short bursts of high speed data write operations may fill the buffer memory, while longer bursts of low speed data read operations may deplete the memory buffer. Therefore, irrespective of whether the originating equipment or the destination equipment is the respective high speed or low speed equipment, the FIFO memory buffer 12 can experience both empty and full statuses. Likewise, when it is known that either system A or system B may respectively write or read data over short bursts, users may want to be certain that the next short burst, perhaps of a predetermined length, can be accommodated by the FIFO 12. In such cases, it is desirable to know whether or not the FIFO memory buffer 12 is full less a certain predetermined amount or is within a predetermined amount of empty. Another common status flag in such systems is the half-full or half-empty status.

With reference again to the exemplary system of FIG. 1A, since data flow is in the direction from the data processor 11 to the CRT terminal 15, a data in-bus 4 provides a transmission medium for the data processor 11 to the FIFO memory buffer 12. Accompanying the data in-bus 4 is a WRITE CLK line 7 on which write commands accompany each word of data transmitted on the data in-bus 4. A status flag line 17 from the FIFO 12 to the data processor 11 signals the latter when the memory buffer is full, half-full, or full within a predetermined number, N. The details of this flag will be dealt with more fully below, A data out-bus 5 extends from FIFO memory 12 to the CRT terminal 15. Digital data is transferred from the FIFO memory buffer 12 to the CRT terminal 15 by read commands issued by the CRT terminal 15 to the FIFO memory buffer 12 on a READ CLK line 8. Thus, data will be read from the FIFO memory buffer 12 and the output on the data out-bus 5 at the rate at which read commands appear on the READ CLK line 8.

The empty, half-empty, or empty+N status of the FIFO memory buffer 12 is signaled to the CRT terminal 15 via STATUS/E line 8. A reset line 9 is directed to the FIFO memory buffer 12 from the data processor 11 and the CRT terminal 15 for initializing the memory buffer to desired initial states.

Figure 1B:
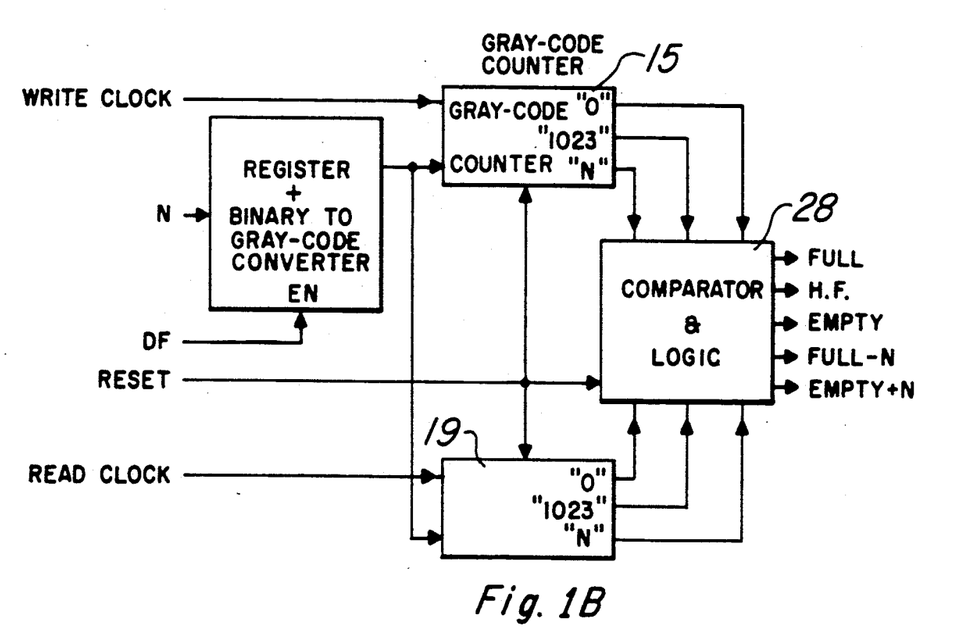
FIG. 1B is a block diagram schematic representation of the status generator 14 of FIG. 1A.

With reference to FIG. 1B, there is shown a further block diagram schematic description of the status generating circuitry 14 of FIFO memory buffer 12. The WRITE CLK buss on line 7 is coupled to a gray-code counter 16 and is capable of counting up to a predetermined number, such as 1023. At reset, it generates a plurality of outputs including zero, the maximum numbers counted, or 1023, and "N", a number predetermined by the user. The READ CLK signals inputted on line 8 to gray counter 19, a reset signal generates corresponding signals of zero, 1023 and N in order to count in gray-code the number of READ CLK pulses. The outputs of gray-code counters 16,19 are coupled to comparator and logic circuitry 28. Within comparator and logic circuitry 28, the various counts of the WRITE CLK pulses and the READ CLK pulses are combined and suitably compared to one another in order to generate the signals full, half-full, empty, full-N, and empty+N.

In a general sense, the RAM based asynchronous FIFO 12 has a depth of $2^M$ words, and generates programmable status flags which indicate whether the FIFO 12 contains N or fewer full or empty words. The value of N is a binary number stored in a depth register before the FIFO 12 reset occurs. The value N can be any value from zero to $2^{(M-1)}-1$. When a reset occurs on line 9, the counters 16,19 are both respectively reset to have outputs zero, 1023 and N, upon initiation of a cycle. The outputs of the counters 16,19 are cross compared by comparator and logic circuitry 28 in order to generate status signals of FULL, HALF-FULL, EMPTY, FULL−N AND EMPTY+N. These status signals are placed on respective status lines 17,18 in order to suitably transmit the status to the respective systems A and B.

Figure 2:
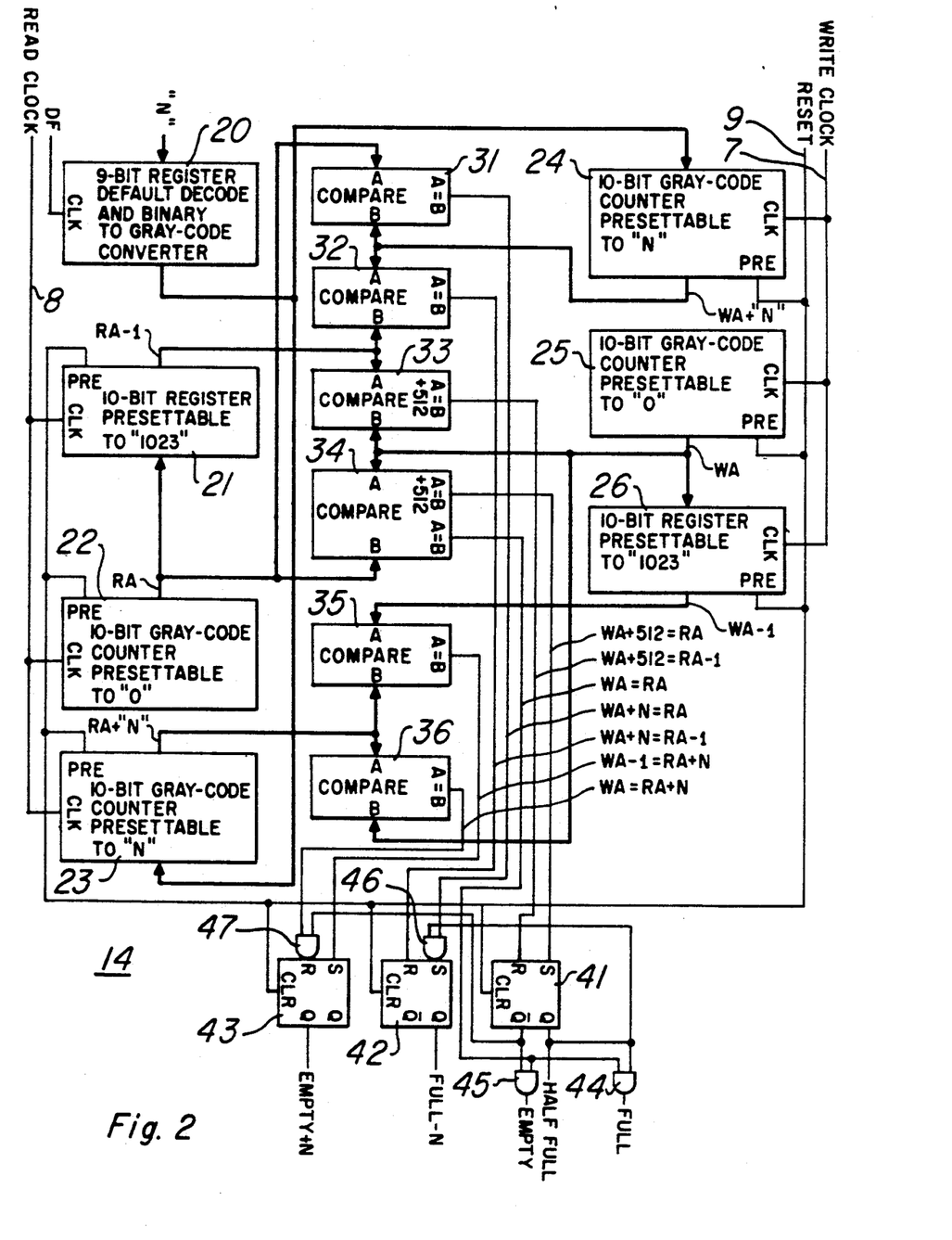
FIG. 2 is a schematic view of the FIFO status generator.

A preferred embodiment of the invention is further shown in FIG. 2. There, the gray-code counter 16 is shown as including a plurality of separate registers and/or counters 20-23. Likewise, the gray-code counter 19 is shown to include counters or registers 24-26. As shown therein, a 1024-word FIFO 12 has input signals of RESET, WRITE CLK, READ CLK, DF and N. The output signals are EMPTY, FULL, HALF-FULL, EMPTY+N AND FULL−N. The latter are status flag outputs that are directed to either line 17 or 18 of the FIFO 12 output as appropriate.

When the reset line 9 is taken high, for example after a power up of FIFO 12, the status circuitry 14 is reset to an initial condition. The WRITE CLK and the READ CLK signals on lines 7,8 are positive-going pulses of fixed duration generated in response to FIFO write and read commands respectively. The input signal DF is used in conjunction with a binary number placed on a 9 bit bus labeled "N" to program the value of N for the status flags EMPTY+N and FULL−N.

The empty flag is high either after a high pulse on the reset input or when the number of FIFO reads equal the number of FIFO writes since the last reset. The FULL flag is high only when the number of FIFO writes exceed the number of FIFO reads by 1024 since the last reset. The HALF-FULL flag is high only when the number of FIFO writes exceeds the number of FIFO reads by 512 or more since the last reset. The latter indicates that the FIFO contains 512 or more full memory words. The EMPTY+N flag is high only when the number of FIFO writes exceeds the number of FIFO reads by N or fewer since the last reset indicating that there are N or fewer full memory words. The FULL−N flag is high only when the number of FIFO writes exceeds the number of FIFO reads by 1024−N or more since the last reset indicating that there are N or fewer empty memory words.

To program the value of N, a 9 bit binary number representing the desired value of N is placed on the N input bus to register 20. This number, N, can be any value from zero through 511. Then, on the next high-to-low transition to the DF input, the number is clocked into the 9 bit register 20. As long as the DF input is held low, anytime a FIFO reset occurs, the stored value of N is used in the EMPTY+N and FULL−N flags. If DF is held high when the reset occurs, the binary number on the bus N is ignored and a default value is programmed into the EMPTY+N and FULL−N flags. The default value for this embodiment is chosen to be 256 but any value from zero through 511 can be chosen. The depth programming, default code, and binary-to-gray-code converter circuits will be discussed later.

The write clock signal on line 7 is connected to a 10 bit gray-code counter 24. Gray-code counter 24 is also coupled to register 20 and thus is preset to N in gray-code. In a similar manner, gray-code counter 25 is preset to zero. The output of gray-code counter 25 is coupled to a register 26 that is preset to 1023. As such, the output of counter 25 always equals the WRITE CLK pulses and the output of register 26 equals the WRITE CLK pulses less 1. Stated another way, the outputs of registers 24,25,26 are respectively, WA+N, WA, and WA−1 where WA equals the number of WRITE CLK pulses since the last reset. The counters 24-26 are incremented and the registers updated on each high-to-low transition of the WRITE CLK signal on line 7. The read clock 8 is connected to a corresponding set of register and counters for monitoring and counting the read clock pulses. Thus, read counter 23 is preset to the number N and generates a signal RA+N that equals the number of read addresses plus a predetermined number N. 10 bit counter 22 generates a signal RA that corresponds to the number of read addresses since the last reset. The output of counter 22 is coupled to the input of register 21. Register 21 is set to 1023 to generate an output signal of RA−1. The output of register 21 is always equal to one less than the total read address clock pulses.

So far, the disclosure has referred to gray code. Gray code within the meaning of this disclosure is a system of binary numbers in which only one of the bits is different between any two consecutive numbers. In a gray-code counter, such as counter 22, only one output changes state due to any given active transition on the clock input. This feature eliminates any decoding glitches which occur when multiple outputs switch at the same time. The latter is a common situation with binary counters. Thus, using gray-code counters, one eliminates the need for any time delays necessary to filter out such glitches. The operation of gray-code counters will be discussed later.

Figure 3:
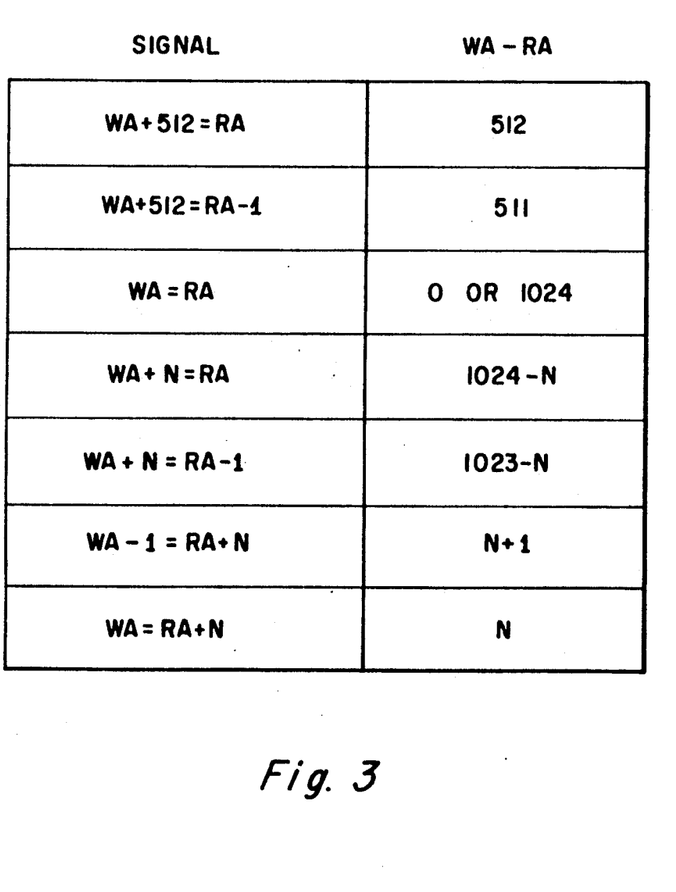
FIG. 3 is the table describing the secondary signals generated by the status generator of FIG. 2.

The output signals of the registers and counters 21-26 are selectively coupled to comparators 31-36 for deriving a number of secondary signals. By comparing read pulse counts with selected constants (N, 512, etc.) to write pulse counts (also with selected constants), one can generate multiple, secondary signals respresentative of the difference between the compared quantities. FIG. 3 summarizes the secondary signals of the preferred embodiment. As such, the signals WA, WA−1, WA+N, RA, RA−1 and RA+N are selectively coupled to comparators 31-36 including at least two comparators 33,34 which add 512 to one side before comparing for generating intermediate signals WA=RA, WA+512+RA, WA+512=RA−1, WA+N=RA, WA+N=RA−1, WA−1=RA+N, and WA=-RA+N.

In order to produce these secondary signals, comparator 31 is coupled to read counter 22 and write counter 24. Thus, comparator 31 compares the signals of RA to WA+N and generates a high output when the two are equal i.e. WA+N=RA. Comparator 32 receives input signals from write counter 24 and read counter 21. As a result, comparator 32 generates the intermediate signals WA+N=RA−1. Comparator 33 compares input signals received from read register 21 and write counter 25. Comparator 33 effectively adds 512 to the A or B side before performing the compare operation so that its output is an intermediate signal of WA+512=RA−1. Comparator 34 has dual outputs. As inputs, comparator 34 receives signal WA from counter 25 and RA from counter 22. Thus, counter 34 generates two output signals, WA+512=RA and WA=RA. Comparator 35 is coupled to write register 26 and read counter 23. The output of comparator 35 is an intermediate signal of WA−1=RA+N. Comparator 36 has its inputs coupled to read counter 23 and write counter 25. The output intermediate signal of counter 23 is WA=RA+N.

The outputs of comparators 31-36 are used to set and reset a group of bistable latches 41-43 that are combined with AND gates 44-45 to generate status flag signals. Those skilled in the art will appreciate that comparators 33 and 34 have outputs in which the number 512 has been previously added to one side in order to generate HALF-FULL status flags. The HALF-FULL status flag is high when the number of writes exceeds the number of reads by 512 or more since the last reset. As such, the HALF-FULL latch 41 must be set high when the value of WA−RA goes from 511 to 512. The latter is accomplished by connecting the WA+512=RA signal to the S input of latch 41. Also, the HALF-FULL latch must be set low when the WA−RA goes from 512 to 511. The latter is accomplished by connecting the WA+512=RA−1 signal to the R input of latch 41. The CLR input to latch 41 is connected to reset so when reset occurs, the HALF-FULL flag is set low.

Figure 4A:
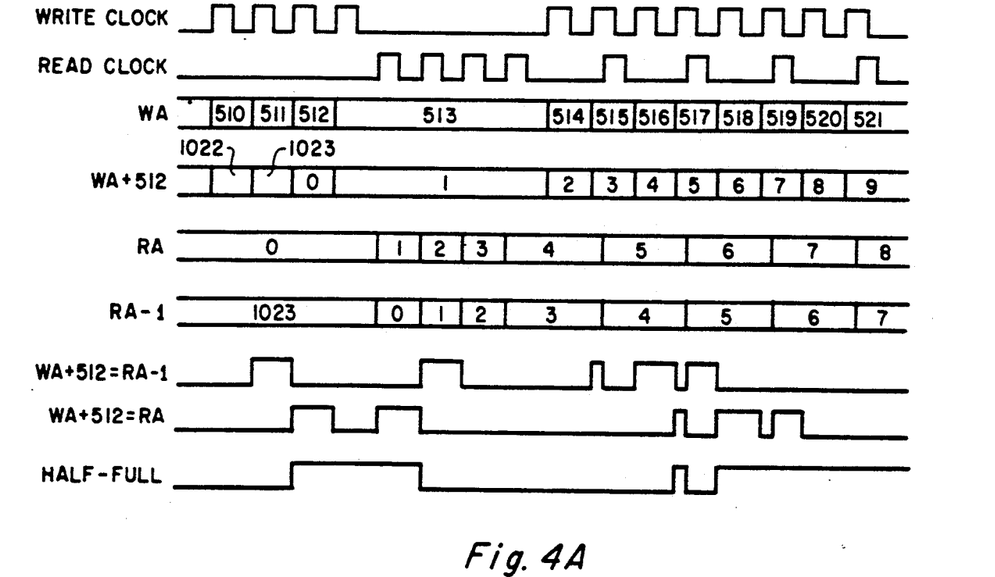
FIG. 4A includes a series of timing diagrams centered about a half-full status condition.
Figure 4B:
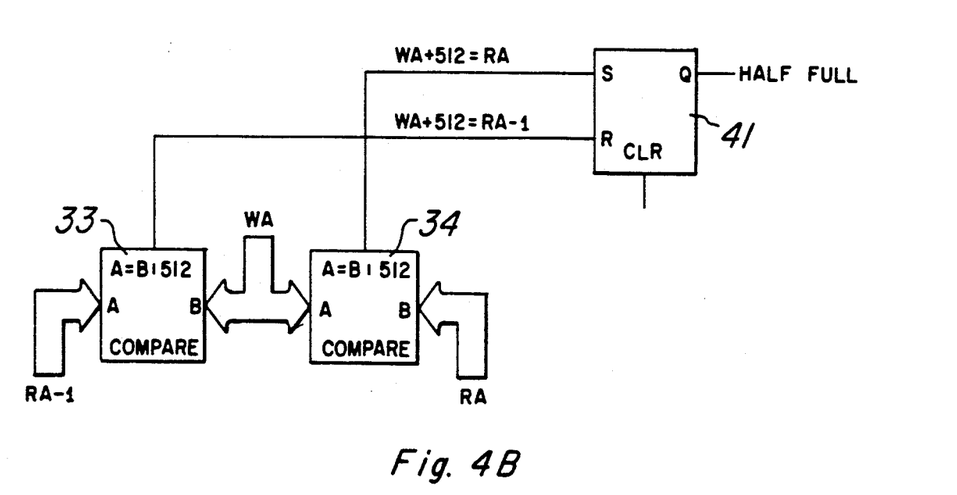
FIG. 4B is a partial schematic of the compare and logic circuitry generating half-full status signals.

The timing diagram and a partial schematic demonstrating the HALF-FULL flag operation appear in FIGS. 4a and 4b. There is shown the operation when doing just writes or reads alone or doing both together. It is evident that there are never any ambiguous states on the flag output. Any time that only one of the latch inputs switches to the active state, whether it is for a long time or a very short time, it is always the input that sets the latch to the state it is already in so the output does not change. Any time both latch inputs change together, they are always changing in opposite directions so no metastable conditions ever exist. If both inputs pulse for an amount of time less than a full clock cycle, the latch output will pulse for approximately the same duration, but this is always a valid status flag indication. If there are timing skews between the propagation delays from the two clocks to the latch inputs due to differences in capacitive loading or other factors, these will only be reflected as slight variations in the propagation delays to the latch outputs which are of little consequence.

The EMPTY+N and FULL−N flags work in a similar manner using signals WA+N=RA, WA+N−=RA−1, WA−1=RA+N, AND WA=RA+N. The propagation delay path from the clock input to the flag output consists of the gray-code counter or register, the compare circuit, the flag latch, and any output buffers required. This delay, according to worse-case spice analysis and actual device measurements is approximately 20 nanoseconds and under typical operating conditions, about 10 nanoseconds.

Since the gray-code counters 21-25 use ten bits, when they reach their maximum count of 1023 and then receive one more clock pulse, they roll back over to zero. For this reason, signal WA=RA represents differences of both zero and 1024 between the number of writes and reads since the last reset. This means that this signal is high when the FIFO is either empty or full. Thus, to generate the EMPTY and FULL flags, WA=RA is ANDed via AND gates 44,45 with HALF-FULL and its inverse so that when the FIFO 12 is less than half full and WA=RA is high, then only the EMPTY flag is high. When the FIFO 12 is over half full and WA=RA is high, then only the FULL flag is high. The AND gates 46,47 on the S input of the FULL−N latch 42 and the R input of the EMPTY+N latch 43 are needed when the value of N is chosen to be zero. In this case, signals WA+N=RA and WA=RA+N are identical so the gate 46 on the FULL-N latch 42 prevents the latch 42 from being set when the FIFO 12 is less than half full and the gate 47 on the EMPTY+N latch 42 prevents the latch 43 from being reset when the FIFO is more than half full.

Figure 5:
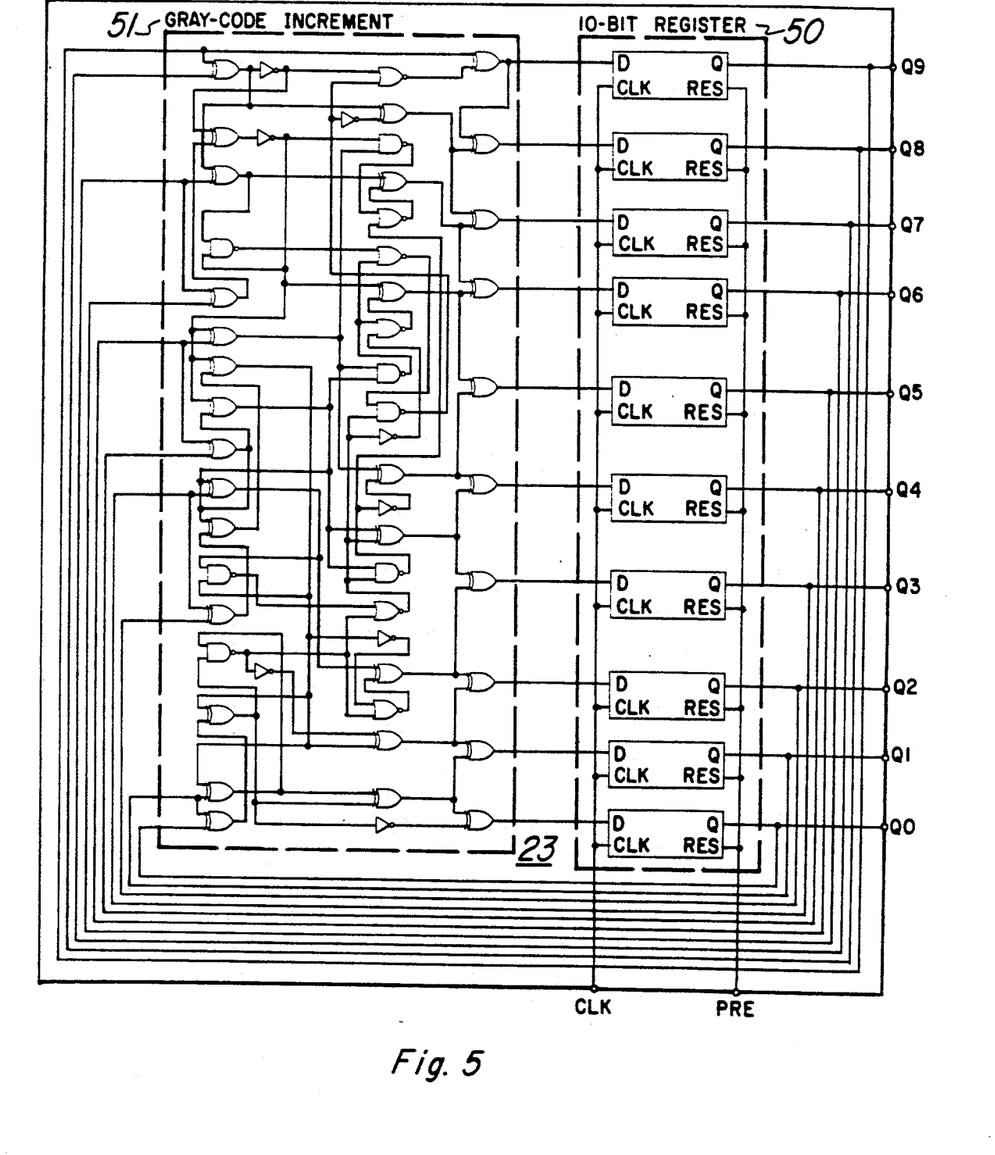
FIG. 5 is a logic schematic of a 10 bit gray-code counter.

A schematic of the gray-code counter 23 presettable to zero is shown in FIG. 5. The circuit consists of a 10-bit clocked register 50 and a 10-bit gray-code incrementer 51. The other counters 22,24,25 are similarly constructed. The 10-bit registers 50 are all reset to zero when a high level appears on the PRE input. When a low-to-high transition appears on the CLK signal, the values on the D inputs of the registers appear on the Q outputs. These outputs go to the inputs of the gray-code incrementer 51. The number is converted to a normal binary number, incremented, and then converted back to a gray-code number which goes back to the D inputs of the registers. Glitches on these signals due to rippling through the incrementer have no effect because the signals don't have to be stable until just before the next clock pulse. The gray-code counters 23, 24 presettable to N are identical to that presettable to zero except that each of the registers representing the nine least significant bits is equipped with an additional D input, the value on which gets loaded into the register when a high level appears on the PRE input. The register containing the most significant bit always gets reset low with a high level on PRE because the value of N is always 511 or less.

Figure 6:
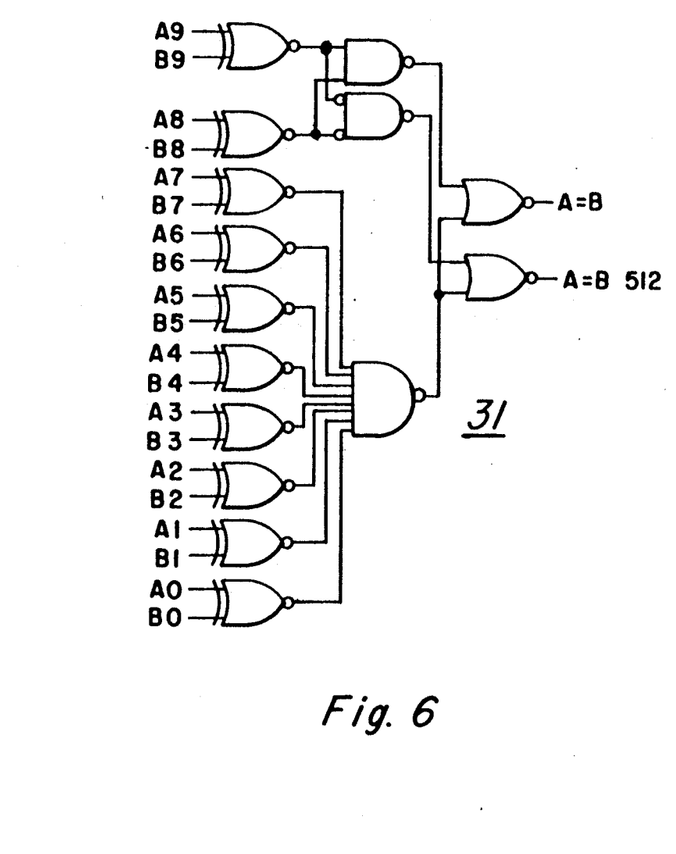
FIG. 6 is a logical schematic of comparator 34.

A schematic of the compare circuit (e.g. comparator 34) appears in FIG. 6. When the A and B inputs of each XNOR gate are at the same logic level, the gate output is high. When all the XNOR outputs are high, the A=B signal is high. When the outputs of the two most significant XNOR gates are low and the rest are high, then the A=B+512 output is high.

Figure 7:
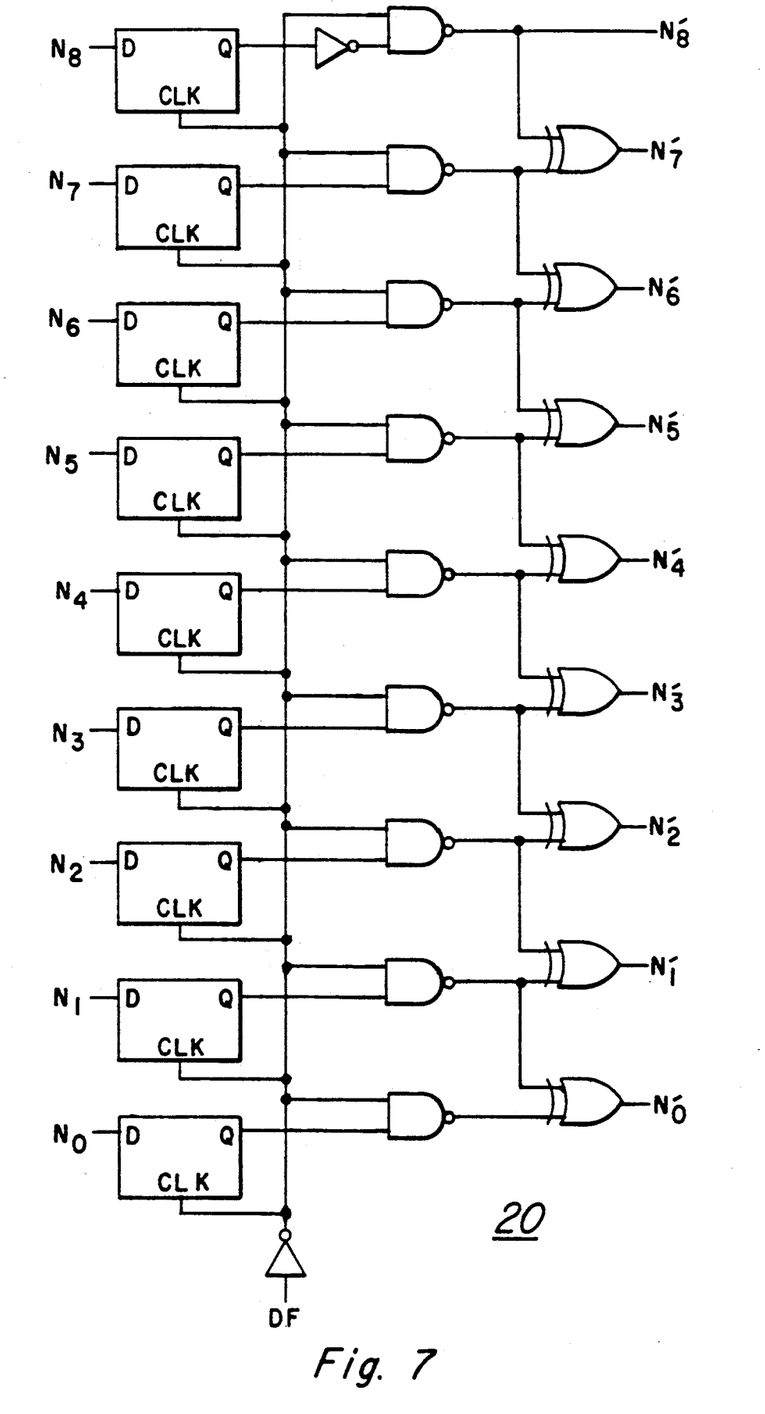
FIG. 7 is a logical schematic representation of register and gray-code counter 20.

The depth programming, default decode, and binary-to-gray-code circuits for register 20 appear in FIG. 7. When DF goes from high to low, the N value on the D input of each flip flop gets clocked to the Q output. As long as DF is low, this Q signal gets passed through the NAND gates to the XOR gates which convert the N value to its equivalent gray-code value on the N' outputs. If DF is taken high, all the NAND gate outputs go high which causes the value of N'0 through N'8 to be the gray-code number 110000000 which corresponds to the number 256 setting the N in the two programmable flags to the default of 256.

Those skilled in the art will appreciate that further modifications, changes, alterations, and omissions may be made to the above-described invention without departing from the spirit and scope thereof as defined by the following claims.

What is claimed is:

1. A method comprising the steps of:
receiving first and second binary signals comprising a first and second respective series of pulses;
presetting a first and second count to respective first and second starting values;
counting said pulses by incrementing said first and second count to generate first and second gray code signals representing a count of the received first and second series of pulses plus the respective first and second starting values;

comparing the first and second gray code signals to each other;

generating a flag signal when the first and second gray code signals are the same.

2. The method of claim 1 further comprising:

generating a plurality of first and second gray code signals with preset counts;

comparing a plurality of pairs of said first and second gray code signals with preset counts to generate a plurality of comparator match signals;

combining selected comparator match signals to generate a plurality of flag signals.

3. The method of claim 1 wherein at least one of said first and second starting values are programmable.

4. The method of claim 1 wherein at least one of said first and second starting values are fixed.

5. The method of claim 1 wherein at least one of said first and second starting values are preset to zero.

6. An apparatus comprising:

first and second registers for receiving first and second binary signals comprising a first and second respective series of pulses;

first and second counters, presettable to respective first and second starting values, for counting said pulses to generate first and second gray code signals representing a count of the received first and second series of pulses plus the respective first and second starting values;

a comparator for comparing the first and second gray code signals to each other;

a flag generator for generating a flag signal when the first and second gray code signals are the same.

7. The apparatus of claim 6 further comprising:

a plurality of gray code converters for generating a plurality of first and second gray code signals with preset counts;

a plurality of comparators for comparing a plurality of pairs of said first and second gray code signals with preset counts to generate a plurality of comparator match signals;

a logic network for combining selected comparator match signals to generate a plurality of flag signals.

8. The apparatus of claim 6 wherein at least one of said first and second starting values are programmable.

9. The apparatus of claim 6 wherein at least one of said first and second starting values are fixed.

10. The apparatus of claim 6 wherein at least one of said first and second starting values are preset to zero.

11. A FIFO memory comprising:

a memory array for reading data in response to a read clock pulse and for writing data in response to a write clock pulse;

a gray code read pulse counter for counting read clock pulses in gray code and a gray code write pulse counter for counting write pulses in gray code, wherein said read pulse counter and said write pulse counter are presettable to respective first and second starting values;

a comparator for comparing the gray code read pulse count to the gray code write pulse count and generating a flag signal when the counts are the same.

12. The FIFO of claim 11 wherein each gray code counter comprises a register for receiving digital clock pulses and a gray code incrementer which comprises a gray-to-binary converter, a binary incrementer, and a binary-to-gray converter.

13. The FIFO of claim 11 wherein at least one of said first and second starting values are programmable.

14. The FIFO of claim 11 wherein at least one of said first and second starting values are fixed.

15. The FIFO of claim 14 wherein at least one of said first and second starting values are preset to zero.

16. The FIFO of claim 14 wherein at least one of said first an second starting values are preset to one less than the capacity of the memory array.

17. The FIFO of claim 11 comprising a plurality of gray code counters, each preset to a predetermined starting value, and a plurality of comparators, each comparator coupled to selected pairs of said gray code counters for deriving a match signal for each pair of selected gray code counters.

18. The FIFO of claim 17 further comprising a logic network for combining said match signals to derive flag signals representative of the memory status.

19. The FIFO of claim 18 wherein the flag signals include one or more selected from the group of full, empty, half full, full less a predetermined amount or empty less a predetermined amount.

20. The FIFO of claim 17 comprising a first group of gray code counters that increment their respective counts in response to write clock pulses and a second group of gray code counters that increment their respective counts in response to read clock pulses.

21. The FIFO of claim 20 wherein said gray code counters comprise counters with a capacity to count M clock pulses.

22. The FIFO of claim 21 wherein one group of gray code counters counts write clock pulses and comprises a counter preset to zero, a counter preset to M-1 and a counter preset to N where $0 \leq N < M/2$.

23. The FIFO of claim 21 wherein another group of gray code counters counts read clock pulses and comprises a counter preset to zero, a counter preset to M-1, a counter preset to N where $0 \leq N < M/2$.

24. The FIFO of claim 21 further comprising a gray code converter for converting a number N to gray code where $0 \leq N < M/2$.

25. The FIFO of claim 17 wherein one or more comparators add a number equalling half the capacity of the FIFO to one side.

26. A comparator circuit for comparing two input n-bit binary signals and generating an output signal when the two inputs are identical comprising:

first and second converters for converting said n-bit binary signals into first and second gray code signals; and a comparator for receiving said first and second gray code signals and generating an output when the first and second gray code signals are identical.

* * * * *